UNITED STATES PATENT OFFICE.

EDWARD ANTHONY AND JESSE BEADLE, OF SHICKSHINNY, ASSIGNORS OF ONE-THIRD THEIR RIGHT TO EDWARD PRICE, JR., OF SCRANTON, PA.

IMPROVEMENT IN COMPOUNDS FOR WELDING STEEL.

Specification forming part of Letters Patent No. 161,730, dated April 6, 1875; application filed January 25, 1875.

*To all whom it may concern:*

Be it known that we, EDWARD ANTHONY and JESSE BEADLE, of Shickshinny, in the county of Luzerne and in the State of Pennsylvania, have invented certain new and useful Improvements in Welding Steel; and do hereby declare that the following is a full, clear, and exact description thereof.

The nature of our invention consists in a compound for welding steel, as will be hereinafter more fully set forth.

In the usual process of converting iron from wrought and cast to refined, there is a dross that runs to waste from the heating-ovens. This dross we use, with lime and saltpeter, to form our compound, in about the following proportions:

| | |
|---|---:|
| Dross | 89.50 |
| Lime | 10.00 |
| Saltpeter | 00.50 |
| | 100.00 |

These ingredients are pulverized and thoroughly mixed together by any suitable and convenient means, and the compound is used for welding steel in a common smith's forge, in the same manner as borax is now commonly used.

The dross, or what is sometimes called cinder or slag, that runs from the heating-furnace in converting puddler-bars into refined iron, is the main element of our compound, and acts as a flux when pulverized, making the pieces of steel into one homogeneous mass, and mixes it together, so that when it is rolled or is hammered the weld is perfect.

This compound may be used for remodeling scraps of steel into bars; also, old steel rails that are useless and worn out; also, cross ends of steel rails into new rails, and to restore the nature of the steel after being overheated or burnt.

We do not confine ourselves to the precise proportions of the ingredients used, as they might, perhaps, be varied somewhat for the different purposes to which the compound is to be applied.

Having thus fully described our invention, what we claim as new, and desire to secure by Letters Patent, is—

The compound for welding steel herein described, consisting of dross, saltpeter, and lime, as set forth.

In testimony that we claim the foregoing we have hereunto set our hands this 1st day of April, 1874.

EDWARD ANTHONY.
    JESSE BEADLE.

Witnesses:
 JOSEPH H. STULL,
 THOMAS PHILLIPS.